2 Sheets—Sheet 1.

A. WILSON.
CORN HARVESTER.

No. 186,653. Patented Jan. 23, 1877.

WITNESSES:
H. Rydquist.
John Goethals.

INVENTOR:
Aaron Wilson.
BY
ATTORNEYS.

N. PETERS, PHOTO-LITHOGRAPHER, WASHINGTON, D. C.

2 Sheets—Sheet 2.

A. WILSON.
CORN HARVESTER.

No. 186,653. Patented Jan. 23, 1877.

WITNESSES:

INVENTOR:
Aaron Wilson
BY
ATTORNEYS.

UNITED STATES PATENT OFFICE.

AARON WILSON, OF TEKAMA, NEBRASKA, ASSIGNOR OF ONE-HALF HIS RIGHT TO C. B. TELYEA.

IMPROVEMENT IN CORN-HARVESTERS.

Specification forming part of Letters Patent No. 186,653, dated January 23, 1877; application filed July 11, 1876.

*To all whom it may concern:*

Figure 1:
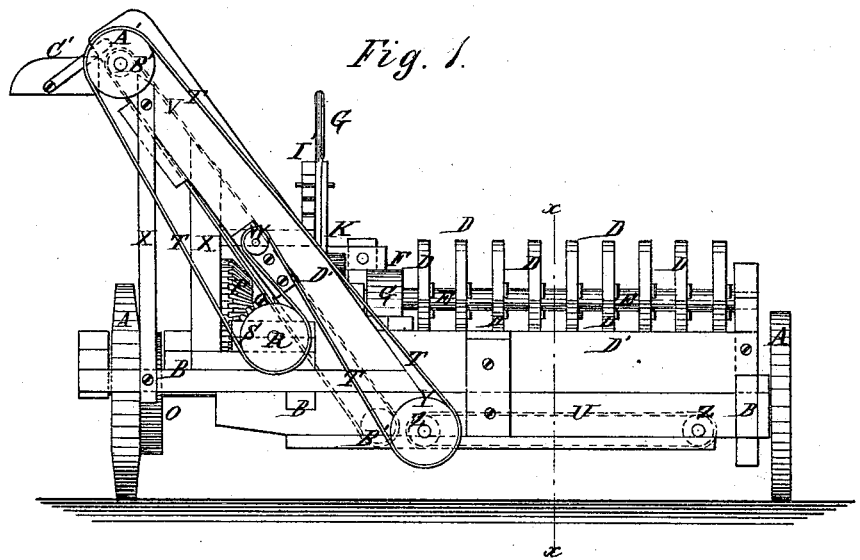
Figure 2:
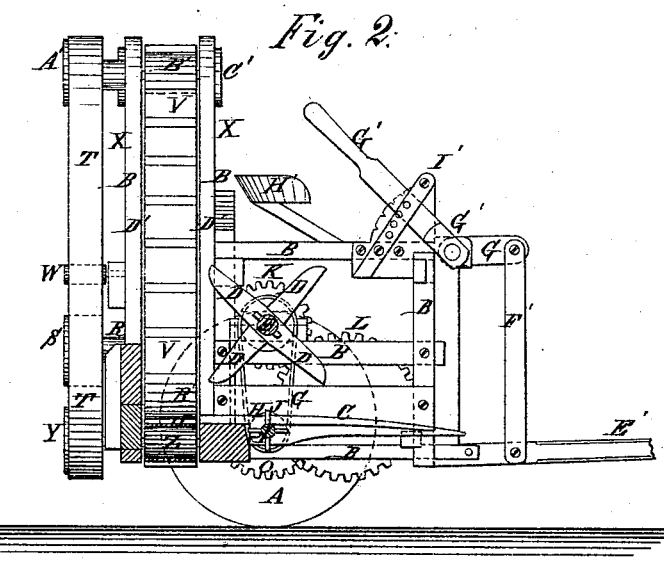
Figure 3:
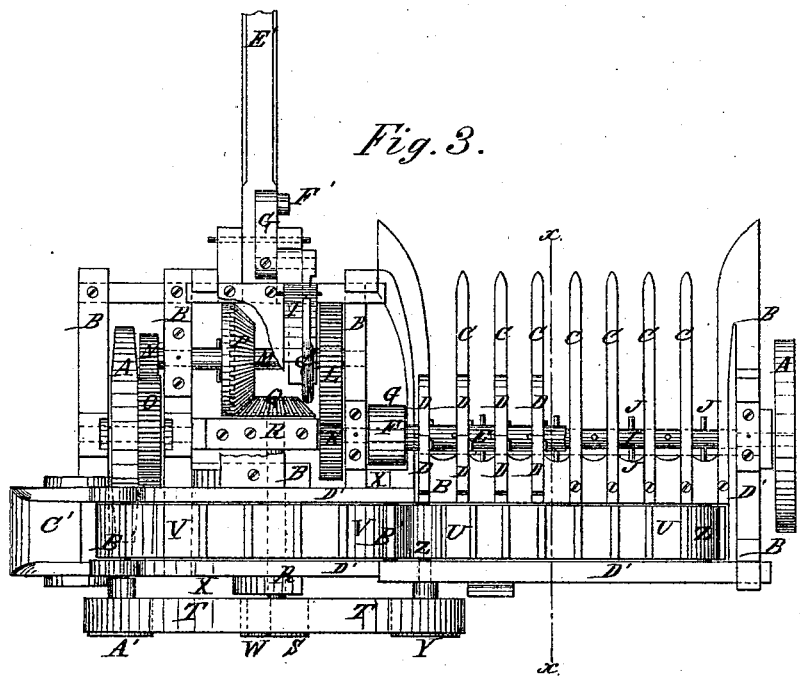

Be it known that I, AARON WILSON, of Tekama, Burt county, Nebraska, have invented a new and useful Improvement in Corn-Harvesters, of which the following is a specification:

Figure 1, Sheet 1, is a rear view of my improved machine. Fig. 2, Sheet 1, is a vertical section of the same, taken through the line $x\ x$, Fig. 1. Fig. 3, Sheet 2, is a top view of the same.

The object of this invention is to furnish an improved machine for gathering corn from the stalks while standing in the field, which shall be simple in construction, easily managed, and reliable in operation, removing all the ears from the stalk.

The invention will first be described in connection with the drawing, and then pointed out in the claim.

A are the wheels, which revolve upon journals attached to the frame B. To the front bar of the platform-frame are attached iron bars or fingers C, at such a distance apart that the stalks can pass between them, but not the ears. The operation of breaking off the ears is assisted by the iron arms D, attached to the shaft E in such positions as to be directly above the guards C.

The shaft E revolves in bearings attached to the frame B, and to it, near one end, is attached a small pulley, F, around which passes a band, G, which also passes around a pulley, H, attached to a shaft, I. The shaft I is placed just below the guards C, and revolves in bearings attached to the frame B. The shaft I and reel D are geared to rotate in opposite directions—one outwardly between the fingers or guards, and the other inwardly above the guards. To the shaft I are attached short fingers or pins J, in such positions as to pass up between the guards C, to pull the stems and stalk, away from any ears that may not be fully broken off by the guards C and arms D. To the end of the shaft E, that carries the arms D, is attached a gear-wheel, K, the teeth of which mesh into the teeth of the gear-wheel L, attached to the short shaft M. The shaft M revolves in bearings attached to the frame B, in such a position that the gear-wheel N, attached to its outer end, may mesh into the gear-wheel O, attached to or formed upon the drive-wheel A. To the middle part of the shaft M is attached a bevel-gear wheel, P, the teeth of which mesh into the teeth of the small bevel-gear wheel Q, attached to the forward end of the short shaft R. The shaft R revolves in bearings attached to the frame B, and to its rear end, at the rear side of the machine, is attached a pulley, S, around which passes the belt T, that drives the platform-belt U and the elevator-belt V. The belt T passes around a guide-pulley, W, pivoted to the elevator-frame X. From the pulley W the belt T passes around a pulley, Y, attached to the end of one of the rollers Z, that carry the platform-belt U, to give motion to said platform-belt. From the pulley Y, the belt T passes around a pulley, A', attached to the end of the upper one of the rollers B', that carry the elevator-belt V. The carrier-belts U V have cross bars or cleats attached to them, so that they may carry the ears with them. From the upper end of the elevator-belt V, the ears slide down a spout, C', into a wagon drawn at the side of the machine. To the frames B and X, at the rear side and outer end of the platform-belt U, and at the sides of the elevator-belt V, are attached boards D', to keep the ears from falling from said belts while being carried by them. To the forward end of the frame B is pivoted the rear end of the tongue E', to which, a little in front of its pivot, is pivoted the lower end of a connecting-bar, F', the upper end of which is pivoted to the end of the forward arm of the bent lever G', the rear arm of which projects into such a position that the driver can readily reach and operate it from his seat H'. The lever G' is pivoted to the upper part of the frame B, and its upper arm works in a guide, I', attached to the frame B, and in which is formed a number of holes to receive the pin by which the said lever G' is secured in any position into which it may be adjusted. The lever G' enables the driver to adjust the guards C to work at any desired distance from the ground.

The machine may be made narrow, to harvest a single row at a time, or wider, to harvest two rows at a time, as may be desired.

I am aware that revolving toothed shafts are not new in corn-harvesters, or stationary fingers in connection with a picker-shaft. These devices I, therefore, desire to disclaim as forming any part of my invention.

Having thus described my invention, I claim as new and desire to secure by Letters Patent—

The combination, in a corn-harvester, of stripping-fingers C, that are stationary, breaker-arms D, that rotate directly over fingers, and stalk-pullers J, that rotate at the rear end of, between, and on an axis under the fingers, as shown and described, for the purpose specified.

AARON WILSON.

Witnesses:
 ROBT. B. DALEY,
 A. T. WHITE.